United States Patent

[11] 3,583,791

[72] Inventor Ikuo Mori
 Kawasaki-shi, Japan
[21] Appl. No. 839,245
[22] Filed July 7, 1969
[45] Patented June 8, 1971
[73] Assignee Nippon Kogaku K. K.
 Tokyo, Japan
[32] Priority July 11, 1968
[33] Japan
[31] 43/48110

[54] RETROFOCUS TYPE PHOTOGRAPHIC LENS
 3 Claims, 2 Drawing Figs.
[52] U.S. Cl. ............................................. 350/214
[51] Int. Cl. .............................................. G02b 9/64
[50] Field of Search............................................ 350/214, 215

[56] References Cited
FOREIGN PATENTS
1,396,907 3/1965 France ........................ 350/214
 46,553 3/1966 Germany..................... 350/214
1,250,153 9/1967 Germany..................... 350/214

Primary Examiner—David Schonberg
Assistant Examiner—Paul A. Sacher
Attorney—Ward, McElhannon, Brooks and Fitzpatrick ABSTRACT: This invention provides a retrofocus-type wide angle lens having a relative aperture of F/2.8, an angle of field of 75° and a back focus of more than 1.3 times the focal length and comprises seven lens elements, the first element is a negative meniscus lens convex to the object side, the second element is a negative meniscus lens convex to the object side, the third element is a biconvex positive lens, the fourth element is a positive meniscus lens concave to the object side, the fifth element is a biconcave negative lens and the sixth and seventh element are positive meniscus lenses concave to the object side, respectively.

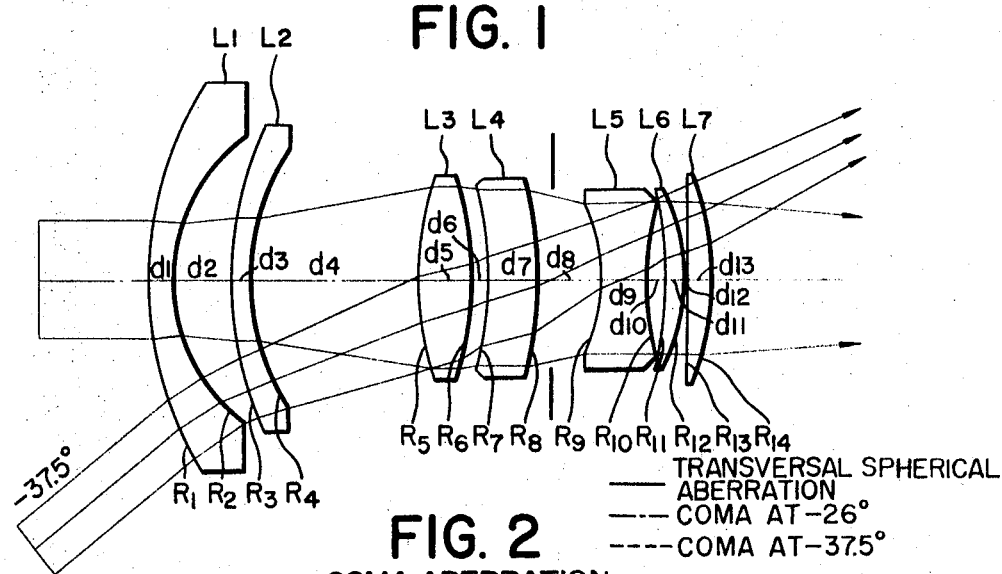
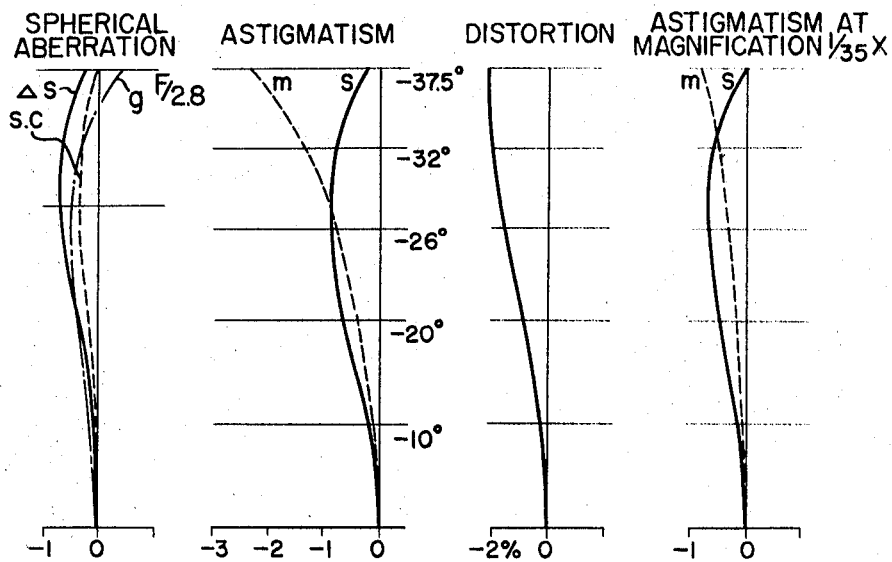

RETROFOCUS-TYPE PHOTOGRAPHIC LENS

This invention relates to a retrofocus-type wide angle lens, and provides a wide angle photographic lens which, besides having performances of a relative aperture of F/2.8, an angle of field of 75°, and a back focus (B.f.) of more than 1.3 times the focal length, has a very small front-lens diameter, compact-sized and lightweight entire body, and highly corrected aberrations.

This invention is to attain the above-mentioned object under conditions that the invented lens comprises seven elements, the first element consisting of a negative meniscus lens $L_1$ convex to the object side, the second element of a negative meniscus lens $L_2$ convex to the object side, the third element of a biconvex positive lens $L_3$, the fourth element of a positive meniscus lens $L_4$ concave to the object side, the fifth element of a biconcave negative lens $L_5$, the sixth and seventh elements of positive meniscus lenses $L_6$ and $L_7$ concave to the object side respectively, and meets the requirements I  $|R_6| > R_5$
II  $d_6 < d_5$ where R is the radius of curvature and $d$ the thickness of lens and air space.

By this arrangement, the distortion is corrected by using the surface of curvature $R_6$ and the air space $d_6$, other aberrations produced by the above are corrected by determining the surface of curvature $R_5$ and the thickness $d_5$ of lens appropriately, and further by utilizing other surfaces.

This invention will be described more clearly referring to the illustrative embodiment shown in the attached drawing, in which:

FIG. 1 is a cross-sectional view of the lens system of an embodiment of this invention; and FIG. 2 gives the aberration curves showing the performance of the lens system shown in FIG. 1.

In FIG. 1, the first element $L_1$ is a negative meniscus lens convex to the object side, the second element $L_2$ is a negative meniscus lens convex to the object side, the third element $L_3$ is a biconvex positive lens, the fourth element $L_4$ is a positive meniscus lens concave to the object side, the fifth element $L_5$ is a biconcave negative lens, the sixth and seventh elements $L_6$ and $L_7$ are positive meniscus lenses concave to the object side, respectively, and the conditions $|R_6| > R_5$ and $d_6 < d_5$ are fulfilled.

Generally, the back focus B.f. can be made greater by making the focal length of a divergent system smaller. But at the same time a greater amount of negative distortion is produced. Usually a part having a positive refractive power is added to the divergent system to correct this aberration. However, the difficulty that accompanies this means of correction is that the focal length of the negative lens must be made shorter, in other words, the radius of curvature of the negative lens must be made smaller in order to obtain a specified length of B.f. because a positive part is employed in the divergent system. This influences much upon spherical aberration and coma aberration. Moreover, the entire lens system becomes larger when a positive part is added.

From reasons as have mentioned so far, correction of distortion is attempted in this invention by forming the divergent system with two negative meniscus lenses, by satisfying the condition I with the succeeding element of lens $L_3$, and by arranging the relationship between the lens $L_3$ and the air space that follows immediately the lens $L_3$ within the range designated by the condition II. This relationship will be described in detail. When the third element and the fourth element are each single lenses, about 3.5 percent of distortion is produced in the negative direction. Although an addition of positive part to the divergent system is considered to correct this aberration as mentioned above, it is not always the best plan when the influence of this measure upon other aberration is considered. The thought of correcting the distortion by intensifying the refractive power of rear-group lenses is inadequate because oblique light rays pass on the upper side of the optical axis in lens groups behind the iris, aberrations other than distortion are strongly influenced. If a single lens is placed right before the diaphragm, since the central light rays of oblique light rays (light rays passing the position of iris) that reach the surface of curvature facing the concave surface towards the object would pass through a region near the optical axis, they have not very much effect on the correction of distortion, and on the contrary, the B.f. is greatly reduced and it is very difficult to maintain the B.f. longer than a fixed length.

Therefore, in this invention, the above-mentioned single lens was divided into two lenses $L_3$ and $L_4$ and the refractive power of the said lens $L_3$ was intensified to correct the distortion. However, although intensifying the surface of curvature $R_6$ obtained by the division of the lens $L_3$ unnecessarily great, results in a farther correction of the distortion, it also effects greatly on the astigmatism. Therefore, the radius of curvature $R_6$, when considered within the limits where the correction of both aberrations is possible, is desirable to be $1.5f < |R_6| < 2.5f$ where $f$ denotes the focal length of the lens system. In this case, the radius of curvature $R_5$, which plays an important part in correcting the spherical aberration, sine condition, and coma aberration, is desirable to lie within the limitations $0.9f < R < 1.2f$. This means that the condition I was determined taking into consideration the effect of both surfaces of curvature of the lens $L_1$. To make the lens have an air space $d_6$ as a result of division is also helpful in obtaining a better correction of the distortion of this lens. The reason is that the rays of light which exit from the lens $L_3$ is refracted more powerfully before they pass through the air space $d_6$ since the lens $L_3$ has a comparatively strong positive refractive power. Thus the air space $d_6$ is effective in correcting the distortion. However, the astigmatism, particularly the shift of sagittal image surface becomes larger than that of other surfaces and there is a fear of over-correcting the sagittal image surface at the peripheral region of the picture surface. Taking into account these defects, the air space $d_6$ is desired to be distributed within the range $0.01f < d_6 < 0.1f$ at most. The thickness of lens $d_5$ serves to correct the negative coma aberration produced at the lower section of the oblique light rays (light rays passing the lower side at the iris position) when the airspace $d_6$ is given. Considering the both effects, the thickness is limited as indicated by the condition II. When the condition I is not fulfilled, the spherical aberration and sine condition are degraded in the positive direction and, simultaneously, the coma aberration is degraded particularly below the middle section of the picture surface, although the distortion is further corrected. When the condition II is not fulfilled degradation of sagittal image surface in positive direction is produced.

Example I

FIG. 1 is the cross section of a retrofocus-type wide angle photographic lens of an example of this invention. The following are the specifications of this lens system when the relative aperture is F/2.8, the angle of field is 75°, and the focal length $f=100$.

| | | | |
|---|---|---|---|
| $R_1 = 96.15$ | $d_1 = 7.00$ | $n_1 = 1.6425$ | $v_{d_1} = 58.1$ |
| $R_2 = 53.85$ | $d_2 = 17.83$ | | |
| $R_3 = 117.48$ | $d_3 = 5.59$ | $n_2 = 1.58904$ | $v_{d_2} = 53.2$ |
| $R_4 = 69.93$ | $d_4 = 52.45$ | | |
| $R_5 = 106.64$ | $d_5 = 15.73$ | $n_3 = 1.76684$ | $v_{d_3} = 46.2$ |
| $R_6 = -188.11$ | $d_6 = 4.90$ | | |
| $R_7 = -192.31$ | $d_7 = 15.38$ | $n_4 = 1.76684$ | $v_{d_4} = 46.2$ |
| $R_8 = -140.91$ | $d_8 = 19.58$ | | |
| $R_9 = -65.04$ | $d_9 = 16.22$ | $n_5 = 1.7552$ | $v_{d_5} = 27.5$ |
| $R_{10} = 188.11$ | $d_{10} = 2.52$ | | |
| $R_{11} = -323.43$ | $d_{11} = 7.00$ | $n_6 = 1.713$ | $v_{d_6} = 53.9$ |
| $R_{12} = -65.39$ | | | |

| | | | |
|---|---|---|---|
| $R_{13}=-8741.25$ | $d_{12}=0.18$ | | |
| $R_{14}=-117.55$ | $d_{13}=6.64$ | $n_7=1.6583$ | $v_{d_7}=57.3$ |
| | $Bf=131.19$ | | | where, $R$ subscript is the radius of curvature of each lens, $d$ subscript the thickness of lens and air space, $n$ subscript the refractive index of the glass used when measured for the $d$ line of the helium spectrum, and $v_d$ subscript the Abbe number.

The seidel aberration coefficients of each refracting surface of this example are as listed in the table below, where I represents the spherical aberration, II the coma aberration, III the curvature of meridional image, IV the curvature of sagital image, and V the distortion.

| | I | II | III | IV | V |
|---|---|---|---|---|---|
| $J_1$ | 0.268 | 0.067 | 0.458 | 0.424 | 0.107 |
| $J_2$ | -3.782 | 0.818 | -1.258 | -0.904 | 0.195 |
| $J_3$ | 1.041 | 0.194 | 0.424 | 0.352 | 0.065 |
| $J_4$ | -5.122 | 0.308 | -0.586 | -0.549 | 0.033 |
| $J_5$ | 7.113 | 1.163 | 0.978 | 0.597 | 0.097 |
| $J_6$ | 2.979 | -1.506 | 2.515 | 0.992 | -0.502 |
| $J_7$ | -2.727 | 1.377 | -2.311 | -0.921 | 0.465 |
| $J_8$ | 5.613 | -2.079 | 2.617 | 1.077 | -0.400 |
| $J_9$ | -11.887 | 2.313 | -2.012 | -1.111 | 0.216 |
| $J_{10}$ | -2.291 | -1.520 | -3.253 | -1.237 | -0.821 |
| $J_{11}$ | 0.149 | 0.263 | 1.264 | 0.335 | 0.592 |
| $J_{12}$ | 4.719 | -0.661 | 0.914 | 0.729 | -0.102 |
| $J_{13}$ | -0.020 | 0.048 | -0.355 | -0.121 | 0.291 |
| $J_{14}$ | 5.319 | -0.784 | 0.684 | 0.453 | -0.067 |
| | 1.372 | 0.001 | 0.079 | 0.116 | 0.169 |

FIG. 2 shows the aberration curves of the Example I. Example II

This example is to offer a compact-sized lens system to be used advantageously in large single lens reflex cameras with formats, for example, 6×6cm. or more. The relative aperture is F/2.8 and angle of field is 78°.

The following are the specifications of this lens system when the relative aperture is F/2.8, angle of field is 78°, and the focal length is $f=100$. $R_9'$, $d_9'$, $n_5'$, and $v_{d5}'$ are added to the lens arrangement of the Example I.

| | | | |
|---|---|---|---|
| $R_1=94.12$ | $d_1=3.14$ | $n_1=1.62041$ | $v_{d_1}=60.3$ |
| $R_2=52.16$ | $d_2=15.69$ | | |
| $R_3=117.65$ | $d_3=3.14$ | $n_2=1.62041$ | $v_{d_2}=60.3$ |
| $R_4=67.84$ | $d_4=52.94$ | | |
| $R_5=101.96$ | $d_5=14.90$ | $n_3=1.76684$ | $v_{d_3}=46.2$ |
| $R_6=-188.83$ | $d_6=4.71$ | | |
| $R_7=-190.20$ | $d_7=14.41$ | $n_4=1.76684$ | $v_{d_4}=46.2$ |
| $R_8=-140.79$ | $d_8=20.59$ | | |
| $R_9=-64.48$ | $d_9=1.96$ | $n_5=1.79504$ | $v_{d_5}=28.4$ |
| $R_9'=147.06$ | $d_9'=15.29$ | $n_5'=1.79668$ | $v_{d_5}'=45.3$ |
| $R_{10}=191.18$ | $d_{10}=2.88$ | | |
| $R_{11}=-323.53$ | $d_{11}=6.08$ | $n_6=1.6968$ | $v_{d_6}=55.6$ |
| $R_{12}=-66.47$ | $d_{12}=0.2$ | | |
| $R_{13}=3,921.60$ | $d_{13}=6.47$ | $n_7=1.6425$ | $v_{d_7}=58.1$ |
| $R_{14}=-99.63$ | $Bf=137.24$ | | |

$Bf=137.24$

What I claim is:

1. An improved retrofocus-type photographic lens consisting of a diaphragm, a front group of spaced-apart lens elements positioned on the object side of said diaphragm and a rear group of spaced-apart lens elements positioned on the image side of said diaphragm, the front group consisting of two negative meniscus lens elements with their concave surfaces facing the diaphragm and the rear group consisting of a biconcave lens element followed by two positive meniscus lens elements, wherein the convex surfaces of said two positive meniscus lens elements are on the image side of the diaphragm and wherein the improvement consists of a middle group of spaced-apart lens elements positioned on the object side of said diaphragm and consisting of a biconvex lens element followed by a positive meniscus lens element with its convex side facing the diaphragm and wherein the following relationships apply:

$|R_6|>R_5$
$d_6<_5$
$R_7>_8$ wherein $R_5$ and $R_6$ are the radii of curvature of the first and second surfaces respectively of the biconvex lens element, wherein the axial thickness of the biconvex lens is $d_5$, wherein the spacing between the biconvex lens and the positive meniscus lens immediately following it is $d_6$, and wherein $R_7$ and $R_8$ are the radii of curvature of the first and second surfaces respectively of the positive meniscus lens immediately following the biconvex lens.

2. A retrofocus-type photographic lens having numerical data substantially as set forth below:

[relative aperture F/2.8, the angle of field 75° and the focal length $f=100$]

| | | | |
|---|---|---|---|
| $R_1=96.15$ | $d_1=7.00$ | $n_1=1.6425$ | $v_{d_1}=58.1$ |
| $R_2=53.85$ | $d_2=17.83$ | | |
| $R_3=117.48$ | $d_3=5.59$ | $n_2=1.58904$ | $v_{d_2}=53.2$ |
| $R_4=69.93$ | $d_4=52.45$ | | |
| $R_5=106.64$ | $d_5=15.73$ | $n_3=1.76684$ | $v_{d_3}=46.2$ |
| $R_6=-188.11$ | $d_6=4.90$ | | |
| $R_7=-192.31$ | $d_7=15.38$ | $n_4=1.76684$ | $v_{d_4}=46.2$ |
| $R_8=-140.91$ | $d_8=19.58$ | | |
| $R_9=-65.04$ | $d_9=16.22$ | $n_5=1.7552$ | $v_{d_5}=27.5$ |
| $R_{10}=-188.11$ | $d_{10}=2.52$ | | |
| $R_{11}=-323.43$ | $d_{11}=7.00$ | $n_6=1.713$ | $v_{d_6}=53.9$ |
| $R_{12}=-65.39$ | $d_{12}=0.18$ | | |
| $R_{13}=-8,741.25$ | $d_{13}=6.64$ | $n_7=1.6583$ | $v_{d_7}=57.3$ |
| $R_{14}=-117.55$ | $Bf=131.19$ | | | where, $R$ subscript is the radius of curvature of each lens, $d$ subscript the thickness of lens and airspace, $n$ subscript the refractive index of the glass used when measured for the $d$-line of the helium spectrum, and $v_d$ subscript the Abbe number.

3. A retrofocus-type photographic lens having numerical data substantially as set forth below:

[relative aperture F/2.8, the angle of field 78°, and the focal length $f=100$]

| | | | |
|---|---|---|---|
| $R_1=94.12$ | $d_1=3.14$ | $n_1=1.62041$ | $v_{d_1}=60.3$ |
| $R_2=52.16$ | $d_2=15.69$ | | |
| $R_3=117.65$ | $d_3=3.14$ | $n_2=1.62041$ | $v_{d_2}=60.3$ |
| $R_4=67.84$ | $d_4=52.94$ | | |
| $R_5=101.96$ | $d_5=14.90$ | $n_3=1.76684$ | $v_{d_3}=46.2$ |
| $R_6=-188.83$ | $d_6=4.71$ | | |
| $R_7=-190.20$ | $d_7=14.41$ | $n_4=1.76684$ | $v_{d_4}=46.2$ |
| $R_8=-140.79$ | $d_8=20.59$ | | |
| $R_9=-64.48$ | $d_9=1.96$ | $n_5=1.79504$ | $v_{d_5}=28.4$ |
| $R_9'=147.06$ | $d_9'=15.29$ | $n_5'=1.79668$ | $v_{d_5}'=45.3$ |
| $R_{10}=191.18$ | $d_{10}=2.88$ | | |
| $R_{11}=-323.53$ | $d_{11}=6.08$ | $n_6=1.6968$ | $v_{d_6}=55.6$ |
| $R_{12}=-66.47$ | $d_{12}=0.2$ | | |
| $R_{13}=-3921.60$ | $d_{13}=6.47$ | $n_7=1.6425$ | $v_{d_7}=58.1$ |
| $R_{14}=-99.63$ | $Bf=137.24$ | | | where $R$ subscript is radius of curvature of each lens, $d$ subscript the thickness of lens and airspace, $n$ subscript refractive index of the glass used when measured for the $d$-line of the helium spectrum and $Vd$ subscript the Abbe number.